Feb. 6, 1934.  R. G. HILL  1,945,608
CONSTANT PRESSURE REACTION GAS TURBINE
Filed Nov. 6, 1931  2 Sheets-Sheet 1

INVENTOR
ROSCOE G. HILL
ATTORNEYS

Feb. 6, 1934. R. G. HILL 1,945,608
CONSTANT PRESSURE REACTION GAS TURBINE
Filed Nov. 6, 1931 2 Sheets-Sheet 2

INVENTOR
ROSCOE G. HILL
By Paul, Paul Moore
ATTORNEYS

Patented Feb. 6, 1934

1,945,608

UNITED STATES PATENT OFFICE 1,945,608

CONSTANT PRESSURE REACTION GAS TURBINE

Roscoe G. Hill, River Falls, Wis., assignor of one-fourth to Hulda Nordstrom, Minneapolis, Minn.

Application November 6, 1931. Serial No. 573,403

6 Claims. (Cl. 60—42)

This invention relates to improvements in rotary or turbine engines and has for an object to provide a gas turbine having a high thermal efficiency and power out-put, is light in weight, and is so designed and constructed that it may be operated successfully and efficiently in a rarefied atmosphere, whereby it is well adapted for operation in high altitudes.

A further object of the invention is to provide a gas turbine of simple construction and having a high compression efficiency, and in which the turbine wheel operates as a single stage compressor whereby the turbine may be operated substantially with pure reaction.

A further object is to provide a gas turbine so constructed as to make it possible to dispense with the usual air compressors now commonly employed in connection with rotary gas engines, thereby reducing to a minimum mechanical losses due to the power consumed by such air compressors; and in which the turbine wheel or rotor is so constructed that the apparatus will operate without over heating without the use of a cooling medium, such as water, circulated around the combustion chamber, as is now more or less common practice, and which has been found objectionable because of the heat wasted by such methods of cooling. The construction of the engine also makes possible the elimination of the usual injection of water directly into the burning fuel, which lowers the thermal efficiency of an engine.

A further object is to provide a constant pressure reaction gas turbine in which the usual objectionable features which have heretofore been present in rotary engines of this general type have been eliminated.

Other objects reside in the general construction and arrangement of the parts of the engine; in the unique construction of the rotor which is preferably constructed of parts suitably secured together to provide an annular combustion chamber within the rotor; in the thin fluid-circulating jacket provided around the combustion chamber into which a suitable cooling fluid is delivered which absorbs heat from the walls of the combustion chamber and is vaporized and converted into high pressure vapor or steam which discharges from said jacket through a series of reaction nozzles to thereby further assist the action of the combustible gases to operate the rotor; in the means provided for preheating the fluid delivered to the fluid jacket; in the means provided for delivering the fuel to the combustion chamber; and, in the means for initially igniting the combustible mixture delivered to the combustion chamber.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

Figure 2:
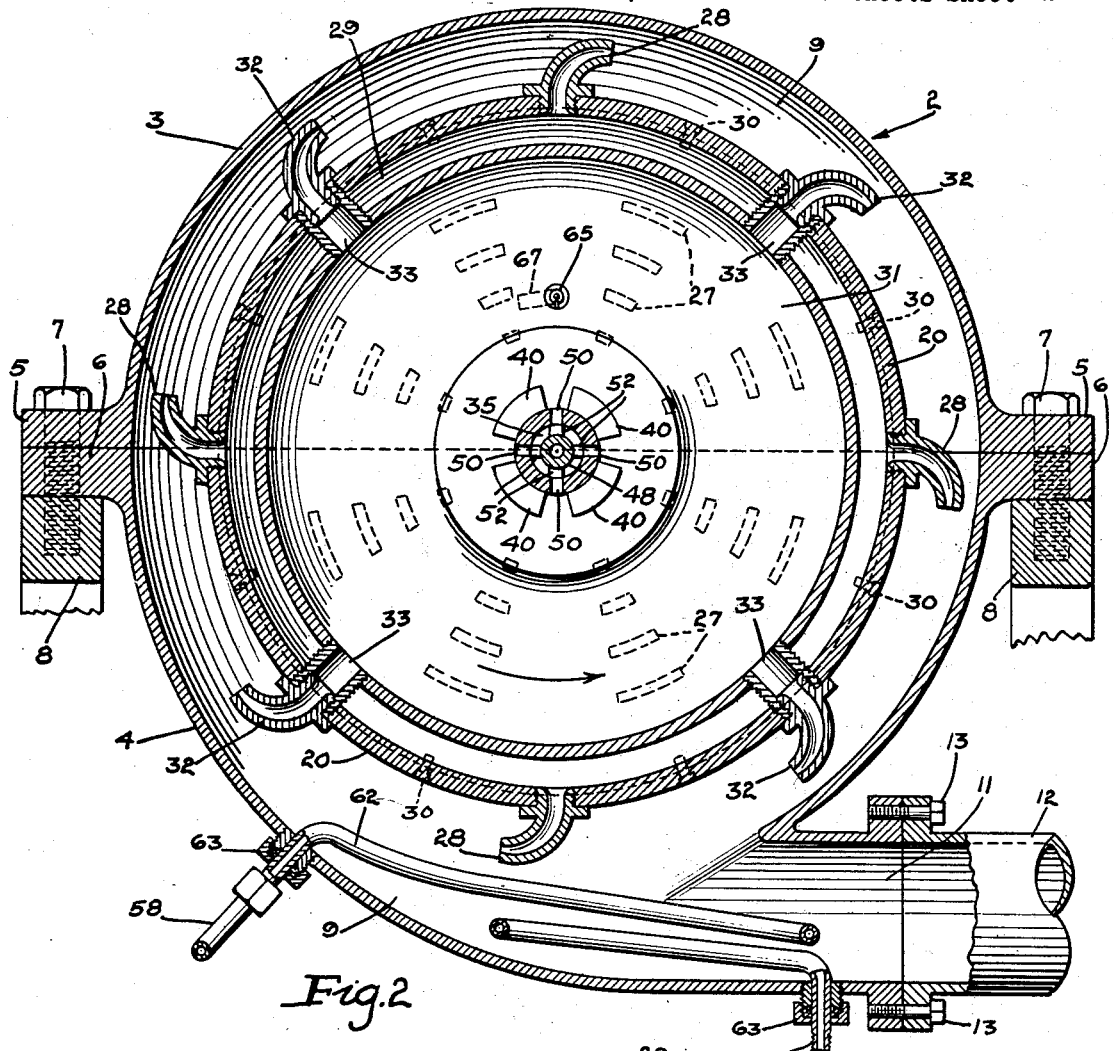
Figure 2 is a cross-sectional elevation on the line 2—2 of Figure 1, showing the arrangement of the rotor nozzles.
Figure 3:
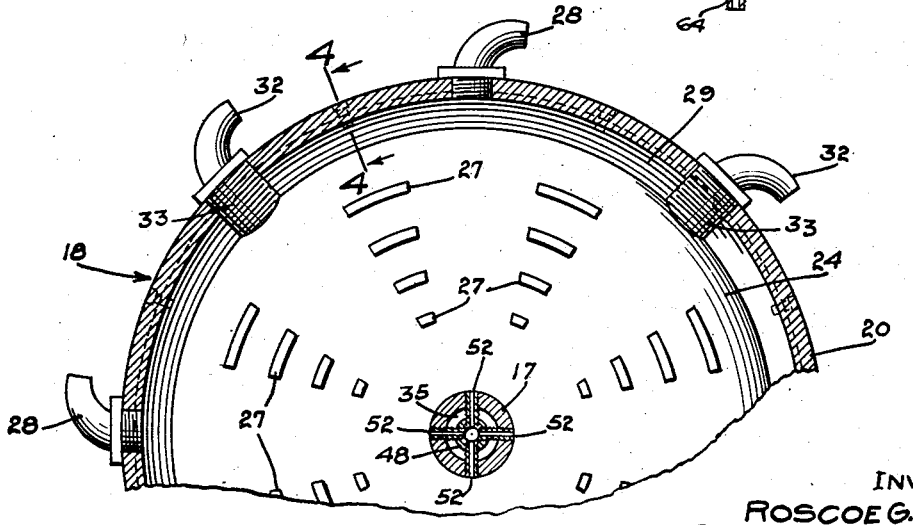
Figure 3 is a detail sectional view showing a portion of the rotor in elevation.

The novel gas turbine featured in this invention is shown comprising a casing 2 composed of an upper section 3 and a lower section 4 provided with suitable apertured lugs 5 and 6, respectively, whereby the two sections may be rigidly bolted together by suitable bolts 7. In Figure 2, the casing is shown mounted upon suitable supports 8. The casing sections 3 and 4 cooperate to provide an exhaust chamber or manifold 9, which is provided at its lower portion with a flanged exhaust opening 11 adapted for connection with a suitable exhaust pipe 12 by such means as bolts 13.

The casing 2 is provided at opposite sides with hubs 14 and 15 in which suitable anti-friction bearings 16 are mounted adapted to support a shaft 17 upon which a rotor 18 is suitably secured. The rotor or turbine wheel 18 is tightly fitted onto the intermediate portion of the shaft 17 and is seated against an annular shoulder 19 provided thereon by suitable lock nuts 21.

Figure 1:
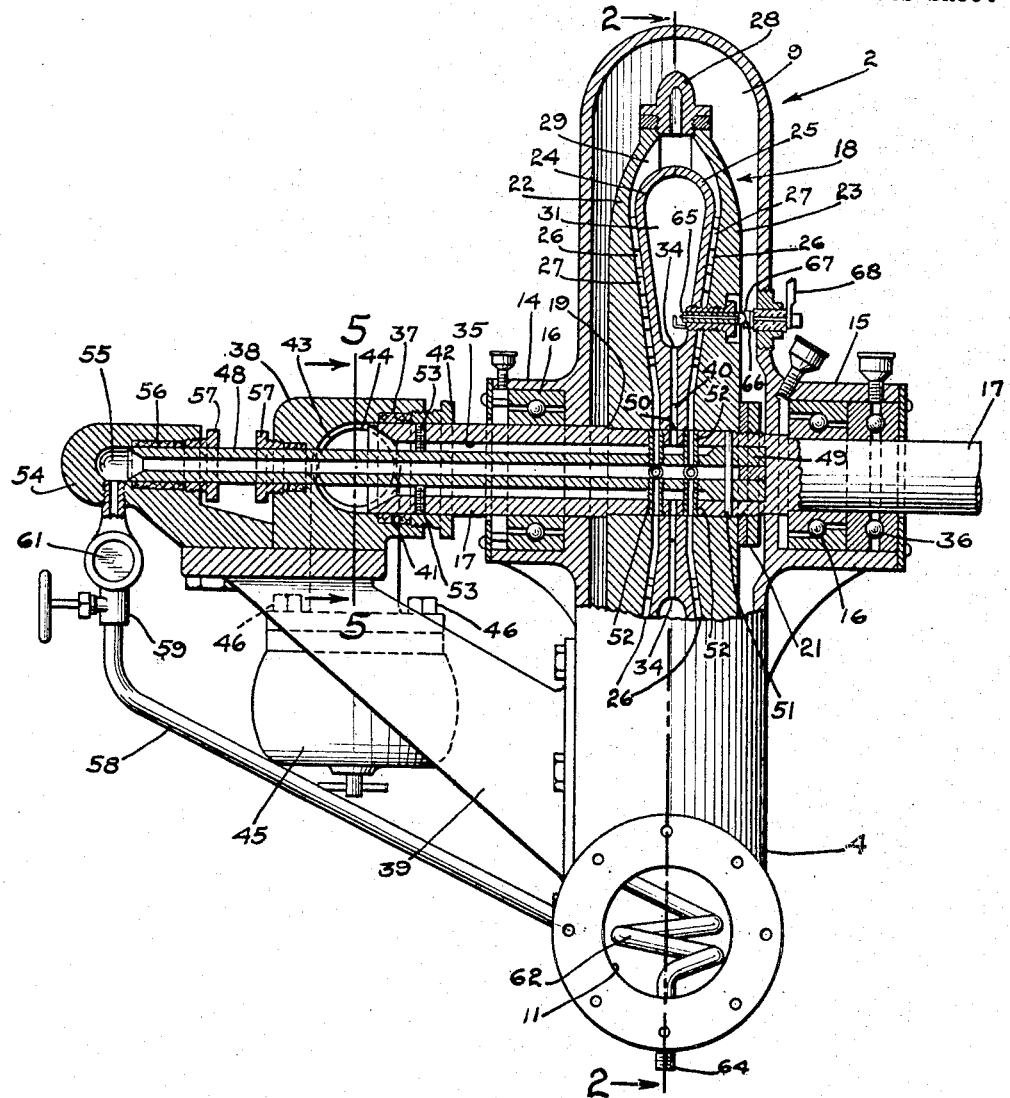
Figure 1 is a side view of my improved engine partially broken away to show the interior construction thereof.
Figure 5:
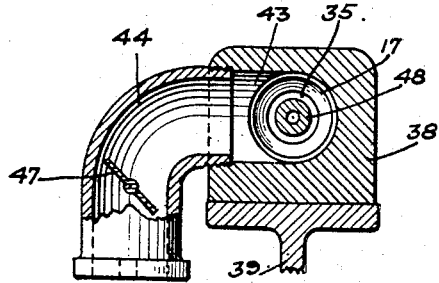
Figure 5 is a detail sectional view on the line 5—5 of Figure 1.
Figure 4:
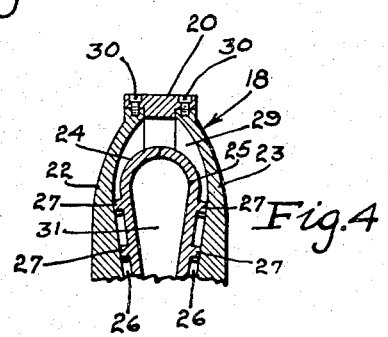
Figure 4 is a detail sectional view on the line 4—4 of Figure 3, showing one way of securing together the outer rotor sections.

The rotor walls are constructed of a plurality of sections; namely, two outer wall sections 22 and 23, and two inner wall sections 24 and 25. The inner surfaces of the outer walls 22 and 23 are spaced from the outer surfaces of the inner walls 24 and 25 so as to provide narrow fluid-circulating passages 26 between these sections, as best shown in Figure 1. Suitable chipping strips or spacers 27 are preferably provided upon the outer surfaces of the inner rotor members 24 and 25 to accurately space apart the outer and inner rotor members, as shown. The inner rotor wall sections 24 and 25 may be suitably secured together at their peripheries by such means as welding; while the outer rotor sections are preferably secured together by an annular ring 20 shrunk onto the peripheral edges of the wall sections and further secured thereto by bolts 30, as best shown in Figure 4. At the periphery of the inner rotor sections 24 and 25, the narrow passages 26 merge into a relatively larger annular chamber 29, as shown in Figure 1. A plurality of reaction nozzles 28 are suitably secured in the peripheral ring 20 of the outer rotor sections 22 and 23 by means of which communication is established between the annular chamber 29 and the exhaust chamber 9, as shown in Figure 2.

An annular combustion chamber 31 is defined by the walls of the inner rotor sections 24 and 25, and this chamber communicates with the exhaust chamber 9 by means of a plurality of reaction nozzles 32, similar to the nozzles 28, and alternately arranged with respect thereto, as shown. Suitable threaded sleeves 33 are secured in the walls of the inner and outer rotor members, and are threaded to receive the nozzles 32. All of the nozzles are curved, as shown in Figure 2, so that the fluid gases will be projected therefrom in directions substantially at right angles to radial lines drawn from the axis of the rotor through the tips of the nozzles.

An annular passage 34 is provided between the inner rotor sections 24 and 25 adjacent their central portions, and communicates with a plurality of radial passages 50 provided in the shaft 17, as shown in Figures 1 and 2, whereby communication is established between the combustion chamber 31 and a bore 35 provided within the shaft 17. Suitable spacing elements 40 are provided between the inner rotor sections adjacent to the shaft 17 to accurately space them apart at that point. The rotor sections are suitably secured together in operative relation upon the shaft 17 by means of suitable keys and the clamping nuts 21, whereby they may be clamped against the annular shoulder 19 to provide, in effect, an integral structure. Thus, it will be seen that the rotor is rotatably mounted within the exhaust chamber 9 of the casing 2, by means of the shaft 17, which is supported by the antifriction bearings 16 mounted in the hubs 14 and 15 of the casing, as shown in Figure 1. A suitable thrust bearing 36 may be provided in the hub 15 to take up the thrust of the shaft in that direction.

The opposite end of the shaft 17 is rotatably mounted within a bore 37 provided in a block 38 which will hereinafter be referred to as the intake manifold. This manifold is secured to a bracket 39 here shown bolted to the lower casing section 4. A suitable packing 41 is provided in the bore 37 and is adapted to be compressed against the shaft by a suitable packing nut 42 received in threaded engagement with a portion of the intake manifold 38. The bore 35 of the shaft 17 communicates with one end of a passage 43 provided in the manifold 38, and the opposite end of this passage is connected with a fitting 44 to which a suitable carburetor or mixing valve 45 may be secured by suitable bolts 46, as shown in Figure 1. A suitable butterfly valve 47 may be provided within the fitting 44 to control the feeding of the fuel to the combustion chamber 31 of the rotor. The bore 35 of the shaft 17 communicates with the combustion chamber 31 in the rotor by means of the ducts or passages 50, as hereinbefore stated.

A fluid feed pipe 48 is mounted within the bore 35 of the shaft 17, and has an enlarged head 49 seated in the bottom of the bore 35 which functions to center the pipe or tube 48 therein. The enlarged end portion 49 of the tube 48 is secured to the walls of the shaft 35 by such means as a pin 51. A plurality of radially disposed nipples 52 are shown secured in the walls of the hollow shaft 17 and pipe 48 and establish communication between the interior of the pipe 48 and the thin flat fluid-circulating spaces 26 provided between the outer and inner rotor members, as best shown in Figure 1. The intermediate portion of the fluid feed pipe 48 is supported within the bore 35 of the shaft 17 by such means as threaded studs 53, received in threaded engagement with the walls of the shaft 17.

As shown in Figure 1, the fluid feed pipe 48 passes through the passage 43 provided in the intake manifold or block 38, and has its adjacent end portion supported in a bracket 54 having a fluid intake port 55 therein communicating with the open end of the fluid feed pipe 48. The feed pipe 48 may be secured to the bracket 54 in leak-proof relation by means of a suitable packing 56 and packing nut 57. A similar packing and packing nut prevent leakage around the pipe 48 where it passes through the wall of the intake manifold 38. The bracket 54 is suitably secured to the upper end of the relatively larger bracket 39 by means of suitable bolts.

The means provided for introducing a suitable fluid into the fluid-circulating spaces 26 of the rotor is shown in Figures 1 and 2, and comprises a small tube 58 which has one end connected with a control valve 59, here shown secured to the bracket 54 and communicating with the fluid intake port 55. The valve 59 is provided with a suitable sight gauge 61, whereby the flow of fluid to the intake port 55 may be noted. The opposite end of the tube 58 is secured to one end of a suitable preheating coil 62, shown disposed within the exhaust chamber 9, and having its end portions suitably secured to the wall of the exhaust housing by suitable packing nuts 63. The end portion 64 of the tube 62 is adapted for connection with a suitable source of fluid under pressure, not shown.

*Operation*

Before starting this novel engine, the fluid control valve 59 is closed and the fuel feed valve 47 opened. The rotor is then rotated in a counter clock-wise direction when viewed as shown in Figure 2, whereupon the air confined within the combustion chamber 31 will be compressed into the outer portion of the combustion chamber because of the centrifugal force tending to develop therein when the rotor is rotated. The air thus compressed in the outer portion of the combustion chamber will escape through the reaction jet nozzles 32 into the annular exhaust chamber 9 of the housing 2. This outward movement of the air in the combustion chamber, at the time of starting, is further accelerated by the Venturi effect developed at the discharge ends of the nozzles as they move through the air within the exhaust chamber 9. Such initial expelling of the air from the combustion chamber 31 tends to produce a partial vacuum therein which causes the combustible fuel mixture delivered into the bore 35 of the shaft from the carburetor 45, to be drawn into the combustion chamber through the radial ports 50 and annular passage 34.

The combustible mixture thus drawn into the combustion chamber is initially ignited by a suitable spark plug 65 mounted in the wall of the rotor, as shown in Figure 1, and having a contact 66 adapted to engage a fixed contact 67, here shown mounted in the wall of the exhaust housing 2. The fixed contact 67 is mounted in insulated relation with respect to the wall of the housing 2 and has a wire 68, whereby, it may be connected to a suitable source of electrical energy, not shown. The contact 67 is so mounted in the wall of the housing 2, that when ignition occurs and the rotor is initially started, it may be moved out of the path of the rotor contact 66.

When the engine is initially started, the spark plug 65 functions to ignite the charge drawn into the combustion chamber 31, whereupon the combustible mixture therein will be ignited and expanded so as to be forcibly discharged through the reaction nozzles 32 into the exhaust chamber 9. Such discharging of the expanding gases from the nozzles 32 into the combustion chamber 9 will, because of the particular arrangement of the nozzles upon the periphery of the rotor, react upon the rotor whereupon the latter will be rotated in the direction indicated by the arrow in Figure 2. Such rotation of the rotor will cause fresh fuel to be continually drawn into the combustion chamber from the bore 35 of the shaft 17, which will immediately become ignited by the burning gases within the combustion chamber, thereby causing the rotor to continue to rotate. As the speed of rotation of the combustion chamber increases, the compression of the combustible gases will be correspondingly increased due to the greater centrifugal tendency induced.

The cross sectional area of the discharge ends of the nozzles may be so proportioned with respect to the intake passages 50 provided at the central portion of the rotor, that the compression within the combustion chamber, resulting from the centrifugal action of the fuel mixture therein and the expansion of a fuel of a known B. t. u., may be calculated to determine the velocity of the gases escaping from the reaction jet nozzles 32, whereby the speed of the rotor may be predetermined. Thus the use of an external compressor may be dispensed with, with its usual high power losses, with the result that an engine of high efficiency is developed. In some instances, it may be found desirable to change the shapes of the passages through the reaction nozzles 28 and 32 from that shown in the drawings as, for example, they may be enlarged at their discharge ends in lieu of being contracted, as here shown.

Another important feature of this invention resides in the means provided for preventing overheating of the walls of the rotor as a result of the burning gases within the combustion chamber 31. To thus prevent over-heating of the rotor, soon after initially starting it, the fluid control valve 59 is opened, thereby admitting a suitable fluid into the thin annular spaces 26 surrounding the walls of the combustion chamber through the nipples 52, provided at the central portion of the rotor. There are several fluids which may be successfully used for this purpose, and the selection of such a fluid depends to some extent upon the use to which the engine is to be put.

The fluid most suitable for an engine of the automobile or ground type, and for large power units where economical operation is of greater relative importance than speed and weight, is water. This water is supplied to the annular spaces 26 surrounding the combustion chamber by means of the pipe 58, valve 59, and fluid feed pipe 48, as hereinbefore described. When the water enters the thin spaces 26 around the combustion chamber, it is immediately converted into super-heated dry steam under high pressure, because of the high temperature of the heated walls of the combustion chamber with which it comes in direct contact. The steam thus generated in the chamber 29 further adds to the efficiency of the engine by converting the heat absorbed from the combustion chamber walls by the cooling fluid, into usable energy, when discharged through the reaction nozzles 28 into the exhaust chamber 9, as will readily be understood by reference to Figure 2. By thus delivering water into the spaces 26 and converting it into steam, the rotor is maintained at an efficient operating temperature and the high pressure steam being projected from the nozzles 28 into the exhaust chamber 9, will cooperate with the gases being projected from the nozzles 32 to operate the rotor at a very high degree of efficiency and with very little loss of heat and power.

In engines where great power out-put is of more importance than extreme economy of operation, as for example, engines used for high altitude flying, for which purpose this engine is particularly well adapted, liquid $CO_2$, (liquid carbonic acid gas), or some other suitable compressed gas may be used in lieu of water.

Liquid $CO_2$, as is well-known, has a very wide range of expansion, and as the possible amount of work obtainable from an expanding gas depends upon its volume change and not upon the high temperature achieved, it follows that a start of expansion from a sub-zero temperature gives a much greater expansion range without the extremely high temperatures which have heretofore made it practically impossible to develop an efficient gas engine of the general character herein disclosed. As the heat of volatilization required is large with $CO_2$ and other non-inflammable gases, when changing over from a liquid to a gas, the possibilities of even greater power than by the use of petroleum products and water, as herein described, is evident.

Because of the novel design and construction of the engine herein disclosed, whereby it may be made extremely light in weight, it readily lends itself for use as a power propelling means for aerial and other craft, where light weight and great power are important factors.

I claim as my invention:

1. In an engine of the class described, a casing having an exhaust chamber therein, a shaft having a bore therein, a rotor mounted on said shaft and comprising inner and outer walls, said inner walls defining an annular combustion chamber, means connected to said bore for supplying a fuel mixture thereto, the outer rotor walls of said combustion chamber cooperating with the inner walls thereof to provide a fluid-circulating chamber substantially surrounding the combustion chamber, a fluid supply pipe mounted within said bore for delivering a suitable cooling fluid to said fluid-circulating chamber, and a plurality of nozzles mounted in the outer wall of the rotor, some of which establish communication between the combustion and exhaust chambers, and others establishing communication between the exhaust chamber and said fluid-circulating chamber.

2. In an engine of the class described, a casing having an exhaust chamber therein, a shaft having a bore therein, a rotor mounted on said shaft and comprising inner and outer walls, said inner walls defining an annular combustion chamber, means connected to said bore for delivering a combustible fuel to the combustion chamber, the outer rotor walls cooperating with the inner walls thereof to provide a fluid-circulating chamber substantially surrounding the combustion chamber, a fluid supply pipe axially mounted within said bore and adapted to deliver a suitable cooling fluid to said fluid-circulating chamber, and a plurality of nozzles mounted in the outer wall of the rotor, alternate nozzles establishing communication between the combustion and exhaust chambers, and the remaining nozzles establishing communication between the exhaust chamber and said fluid circulating chamber.

3. In an engine of the class described, a casing having an exhaust chamber therein, a shaft mounted in said casing, a rotor secured to the shaft within the casing and having an annular combustion chamber therein, means in the shaft for delivering a suitable fuel to the combustion chamber, said rotor having a fluid jacket surrounding the combustion chamber, a series of reaction nozzles mounted in the periphery of the rotor and establishing communication between the combustion and exhaust chambers, a second series of nozzles mounted in the periphery of the rotor and connecting the fluid jacket with the exhaust chamber, a fluid passage in said shaft connected at one end with said fluid jacket and at its opposite end with means for supplying a preheated fluid thereto, said preheated fluid being generated into steam when delivered into said fluid jacket in contact with the heated walls of the combustion chamber, whereby it is utilized as an additional driving medium and means for initially igniting the fuel in the combustion chamber.

4. In an engine of the class described, a casing having an exhaust chamber therein, a shaft mounted in said casing, a rotor secured to the shaft within the casing and having an annular combustion chamber therein, a plurality of fluid passages within said shaft and extending lengthwise thereof and arranged, one upon the other, one of said passages being adapted to deliver a suitable fuel to the combustion chamber, said rotor having a fluid jacket surrounding the combustion chamber, a series of reaction nozzles mounted in the periphery of the rotor and establishing communication between the combustion and exhaust chambers, a second series of nozzles mounted in the periphery of the rotor and connecting the fluid jacket with the exhaust chamber, the other of said fluid passages connected at one end with said fluid jacket and at its opposite end with means for supplying a fluid thereto, and means for initially igniting the fuel in the combustion chamber.

5. In an engine of the class described, a casing having an exhaust chamber therein, a shaft mounted in said casing, a rotor secured to the shaft within the casing and having an annular combustion chamber therein, a fuel passage in the shaft for delivering a suitable fuel to the combustion chamber, said rotor having a thin fluid jacket surrounding the combustion chamber, a series of reaction nozzles mounted in the periphery of the rotor and establishing communication between the combustion and exhaust chambers, a second series of nozzles mounted in the periphery of the rotor and alternately arranged with respect to said first mentioned nozzles and connecting the fluid jacket with the exhaust chamber, a fluid passage in said shaft connected at one end with said fluid jacket and at its opposite end with means for supplying a preheated fluid thereto, and means for igniting the fuel in the combustion chamber, the combustion of the fuel in said chamber causing the walls thereof to be heated, whereby the fluid delivered to said fluid jacket is converted into steam, which steam is discharged through said second series of nozzles into the exhaust chamber to assist in driving the rotor.

6. In an engine of the class described, a casing having an exhaust chamber therein, a rotor mounted in said chamber and having an annular combustion chamber therein, means for delivering a combustible fuel to the combustion chamber, said combustion chamber being larger in cross section at the periphery of the rotor than at the central portion thereof, a plurality of nozzles establishing communication between the exhaust and combustion chambers, said rotor also having a fluid jacket surrounding the combustion chamber, means for delivering a suitable cooling medium to the fluid jacket, a second series of nozzles connecting the fluid jacket with the exhaust chamber, the portions of said fluid jackets at the sides of the combustion chamber being relatively small in area and enlarging in size at the periphery of the rotor to provide an enlarged annular chamber, the cross-sectional area of the fluid jacket at the sides of the combustion chamber being relatively small so as to cause the cooling medium delivered to the fluid jacket to be quickly converted into steam, when engaging the heated walls of said combustion chamber, said steam discharging from said second series of nozzles into the exhaust chamber to thereby assist in driving the rotor.

ROSCOE G. HILL.